(12) United States Patent
Aipperspach et al.

(10) Patent No.: US 9,553,584 B2
(45) Date of Patent: Jan. 24, 2017

(54) LEVEL-SHIFTING LATCH (71) Applicant: International Business Machines Corporation, Armonk, NY (US)

(72) Inventors: Anthony G. Aipperspach, Rochester, MN (US); Steven J. Baumgartner, Zumbro Falls, MN (US); Charles P. Geer, Rochester, MN (US); David P. Paulsen, Dodge Center, MN (US); David W. Siljenberg, Byron, MN (US); Alan P. Wagstaff, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/580,480

(22) Filed: Dec. 23, 2014

(65) Prior Publication Data

US 2016/0182052 A1 Jun. 23, 2016

(51) Int. Cl.
*H03K 19/0175* (2006.01)
*H03K 19/0185* (2006.01)
*G06F 17/50* (2006.01)

(52) U.S. Cl.
CPC ..... *H03K 19/018521* (2013.01); *G06F 17/505* (2013.01)

(58) Field of Classification Search
USPC .................................. 326/68, 80–81; 327/333
See application file for complete search history.

(56) References Cited

U.S. PATENT DOCUMENTS 4,458,337 A * 7/1984 Takemae ............ H03K 3/35606
326/70
7,061,299 B2 * 6/2006 Khan ............... H03K 3/356113
326/68

(Continued)

FOREIGN PATENT DOCUMENTS

DE 102008014916 A1 10/2008
DE 102008014916 B4 7/2010

(Continued)

OTHER PUBLICATIONS

Aipperspach, et al., "Level-Shifting Latch," U.S. Appl. No. 14/582,396, filed Dec. 24, 2014.

(Continued)

*Primary Examiner* — Anh Tran
(74) *Attorney, Agent, or Firm* — Wood, Herron & Evans, LLP; Robert R. Williams (57) ABSTRACT

A level-shifting latch circuit for coupling a first circuit in a first voltage domain with a second circuit in a second voltage domain, includes an input node to receive an input signal provided by the first circuit, and an output node to output a level-shifted signal, corresponding with the input signal. The level-shifting latch circuit also includes a first latch, having a first node and a second node, for storing the input signal in the first voltage domain, and a second latch, having a third node and a fourth node, for storing the input signal in the second voltage domain. In addition, the level-shifting circuit also includes a first switching element which provides a path to transfer a low voltage at the first node to the third node, and a second switching element which provides a path to transfer a low voltage at the second node to the fourth node.

7 Claims, 6 Drawing Sheets

(56) References Cited

U.S. PATENT DOCUMENTS

| | | | |
|---|---|---|---|
| 7,132,856 B2* | 11/2006 | Hsu et al. ..................... | 326/81 |
| 7,592,849 B2* | 9/2009 | Campardo ............ | G11C 5/145 |
| | | | 326/80 |
| 2008/0266992 A1 | 10/2008 | Terzioglu et al. | |
| 2009/0010041 A1 | 1/2009 | Afghahi et al. | |
| 2009/0033403 A1 | 2/2009 | Nomura | |
| 2013/0043926 A1 | 2/2013 | Gion | |
| 2013/0106474 A1 | 5/2013 | Kossel et al. | |

FOREIGN PATENT DOCUMENTS

| | | |
|---|---|---|
| EP | 0471289 A1 | 2/1992 |
| EP | 0608489 A2 | 8/1994 |
| WO | 2013109683 A1 | 7/2013 |

OTHER PUBLICATIONS

List of IBM Patents or Patent Applications Treated as Related.
Lysfjord, I., "Multiple Power Domains," Master paper, Norwegian University of Science and Technology, Department of Electronics and Telecommunications, Jun. 2008.
Shenai, K, "New Millennium Ultralow Power Microsystems," Proceedings of the National Aerospace and Electronics Conference, 2000, IEEE, pp. 459-468. DOI: 10.1109/NAECON.2000.894946.

\* cited by examiner

LEVEL-SHIFTING LATCH

BACKGROUND

The present disclosure relates to electronic latch circuits, and more specifically, to a voltage level-shifting electronic latch circuit.

Electronic circuits can operate on a range of supply voltages. For example, a supply voltage (VDD) may be 3.3V in a certain application, and may be 1.0V in another application. Digital circuits may respond to logic values represented by certain ranges of voltages (logic threshold voltages) within their operating voltage range. A certain family of logic circuits, for example, can respond to voltages that are above 66% of the circuit's supply voltage as a logic "1". The same family of logic circuits can respond to voltages that below 33% of the circuit's supply voltage as logic "0". Consequently, two different families of digital logic circuits that have different supply voltages may define their logic thresholds ranges using different voltage levels. A first logic circuit from a family that uses a first logic threshold range can have a need to communicate with a second logic circuit from a family that uses a second, different logic threshold range. Accordingly, a circuit at the interface between the first and second logic circuits that shifts the voltage levels used by one circuit to the voltages levels used by the other circuit enables the two circuits to communicate.

A latch is an electronic circuit that can be used to store a piece of electronic information (e.g. a logic value). The latch circuit captures or latches on to one of two stable states based on the input of one or more input/control signals. A latch circuit can maintain the latched state even after the input/control signals are removed. An electronic latch may be constructed from pairs of cross coupled inverters.

Logic circuits may use complementary metal-oxide-semiconductor (CMOS) transistors. CMOS transistors include n-channel field effect transistors (NFET) and p-channel field effect transistors (PFET).

SUMMARY

According to embodiments of the present disclosure, a level-shifting latch circuit can couple a first circuit in a first voltage domain with a second circuit in a second voltage domain, where the first voltage domain has a first supply voltage and the second voltage domain has a second supply voltage. In some embodiments, the level-shifting latch circuit includes an input node to receive an input signal provided by the first circuit, and a first output node to output a level-shifted output signal, corresponding with the input signal, to the second circuit. In addition, the level-shifting latch circuit includes a first latch for storing the input signal in the first voltage domain. The first latch has a first node and a second node, with the input node selectively coupled to the first node. The level-shifting latch circuit also includes a second latch for storing the input signal in the second voltage domain. The second latch has a third node and a fourth node, with the first output node coupled to the fourth node.

In various embodiments, the level-shifting latch circuit includes a first switching element, serially coupled between the first node and the third node, which is closed when a voltage at the second node is low. The first switching element, when closed, provides a path to transfer a low voltage at the first node to the third node. The level-shifting circuit also includes a second switching element, serially coupled between the second node and the fourth node, which is closed when a voltage at the first node is low. The second switching element, when closed, provides a path to transfer a low voltage at the second node to the fourth node.

Various embodiments of the present disclosure are directed to methods for coupling a first circuit in a first voltage domain with a second circuit in a second voltage domain, where the first voltage domain has a first supply voltage and the second voltage domain has a second supply voltage. The methods include receiving an input signal from the first circuit and storing the input signal in a first latch, where the first latch has a first node and a second node, and is powered by the first voltage. The methods also include transferring a logic state of the stored input signal to a second latch, having a third node and a fourth node, through both a first switching element configured to pass a low voltage from the first node to the third node when a voltage at the second node is low, and a second switching element configured to pass a low voltage from the second node to the fourth node when a voltage at the first node is low, wherein the second latch is powered by the second voltage. The second latch is powered by the second voltage. Further, the methods include providing a level-shifted output signal, corresponding with the input signal, from the second latch to the second circuit.

Additional embodiments are directed to design structures for coupling a first circuit in a first voltage domain with a second circuit in a second voltage domain, where the first voltage domain has a first supply voltage and the second voltage domain has a second supply voltage.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic latch circuits, more particular aspects relate to a voltage level-shifting electronic latch circuit. While the present disclosure is not necessarily limited to such applications, various aspects of the disclosure may be appreciated through a discussion of various examples using this context.

Embodiments of the present disclose are directed towards a level-shifting electronic latch circuit that can capture input data and control signals from circuits operating with a first supply voltage, and provide symmetrically latched outputs to circuits in both a first and a second voltage domain (e.g., the set of threshold and supply voltages characteristic of a family of circuits). The circuit can provide a low leakage interface between one family of logic circuits, such as can be found on a microprocessor chip, and a second family of logic circuits, such can be found on an input-output (I/O) controller.

The term "couple" or "coupled" includes indirect and direct electrical connection. Thus, if a first device is coupled to a second device, that connection may be through a direct electrical connection, or through an indirect electrical connection via other devices and connections.

Figure 1:
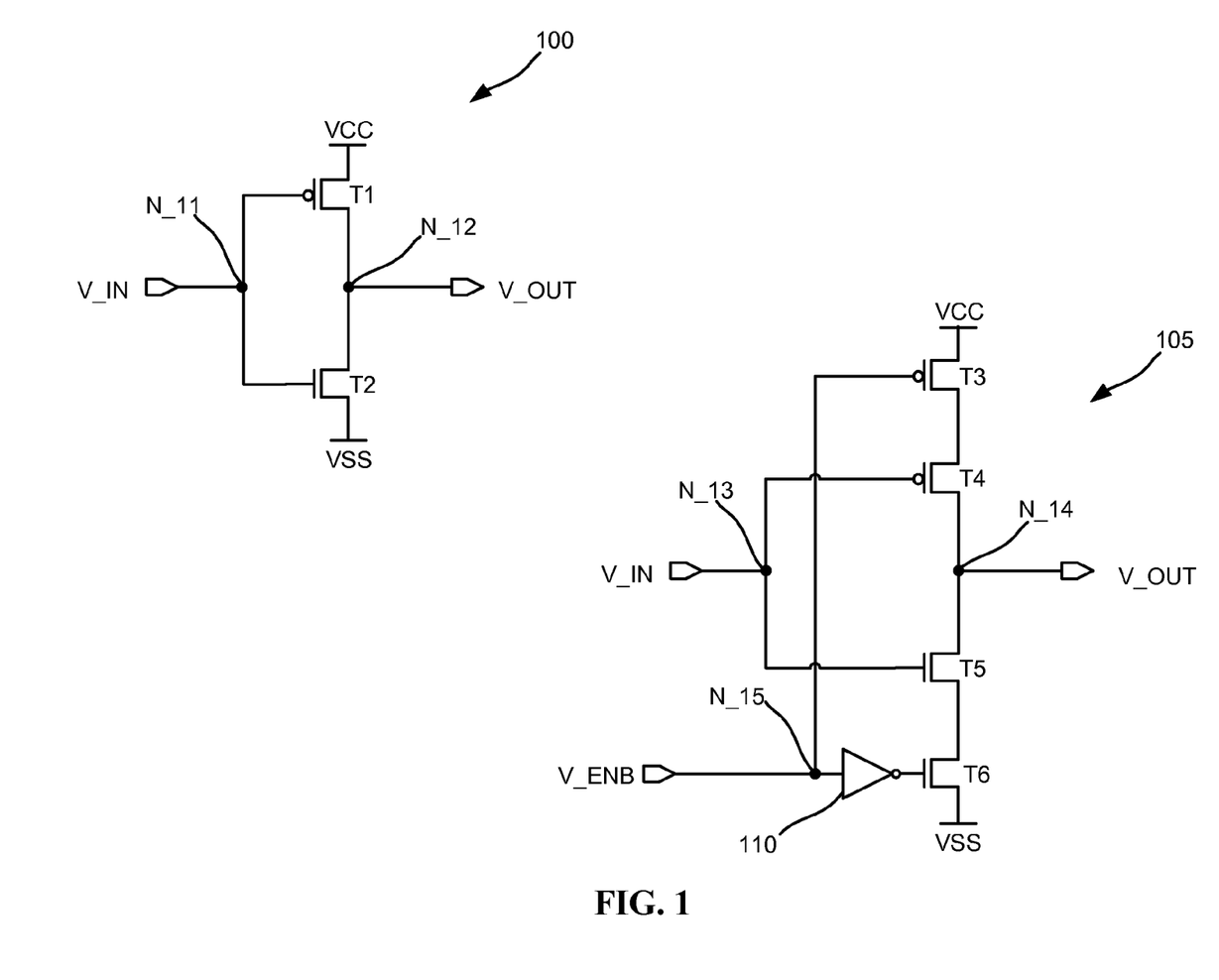
FIG. 1 depicts a CMOS inverter circuit and a gated inverter circuit having an output enable control signal, according to various embodiments.

Turning now to the figures, FIG. 1 depicts a CMOS inverter circuit 100 and a gated CMOS inverter circuit 105 having an output enable control signal, according to various embodiments. A logic inverter circuit converts an input signal in one logic threshold range (e.g., above 66% of positive supply voltage for a logic 1) to an output signal in the opposite logic threshold range (e.g., below 33% of positive supply voltage for a logic 0). An inverter from a logic family having a supply voltage 3.3 volts (V), for example, can have a logic threshold range for a logic 0 between 0V and 1.09V, and a logic threshold range for a logic 1 between 2.18V and 3.3V. Such an inverter can convert a logic 0 input having a signal value of 0.5V to a logic 1 output having a signal value 2.5V. The same inverter can convert a logic 1 input having a signal value of 2.5V to a logic 0 output having a signal value 0.5V.

The circuit 100 shows a first inverter circuit formed by PFET transistor T1 and NFET transistor T2. The transistors T1 and T2 are serially connected between the positive supply voltage VCC and the negative supply rail VSS (typically ground for CMOS circuits). The inverter in circuit 100 accepts an input signal V_IN at node N_11 and produces output signal V_OUT at node N_12. As discussed herein, when V_IN is within a given logic threshold range, V_OUT will be in the complementary logic threshold range.

FIG. 1 shows a gated inverter circuit 105 formed by transistors T3, T4, T5, T6 and inverter 110. Inverter 110 can be an embodiment of the inverter show in circuit 100. As depicted in gated inverter circuit 105, the transistors T3, T4, T5, and T6 are serially connected between VCC and VSS. The input of inverter 110 is connected to the gate of transistor T3 and the output enable signal V_ENB via node N_15, while the output of inverter 110 is connected to the gate of transistor T6. Transistors T4 and T5 form an inverter which accepts an input signal V_IN at node N_13 and produces an output signal V_OUT at node N_14. Transistors T3 and T6, along with inverter 110, form a gating circuit which enables or disables the operation the inverter formed with transistors T4 and T5. When V_ENB is low (within the logic threshold range for a logic 0), the output of the inverter formed with T4 and T5 may be enabled. When V_ENB is high (within the logic threshold range for a logic 1), the output of the inverter formed with T4 and T5 may be disabled (exhibiting a high impedance state).

Figure 2:
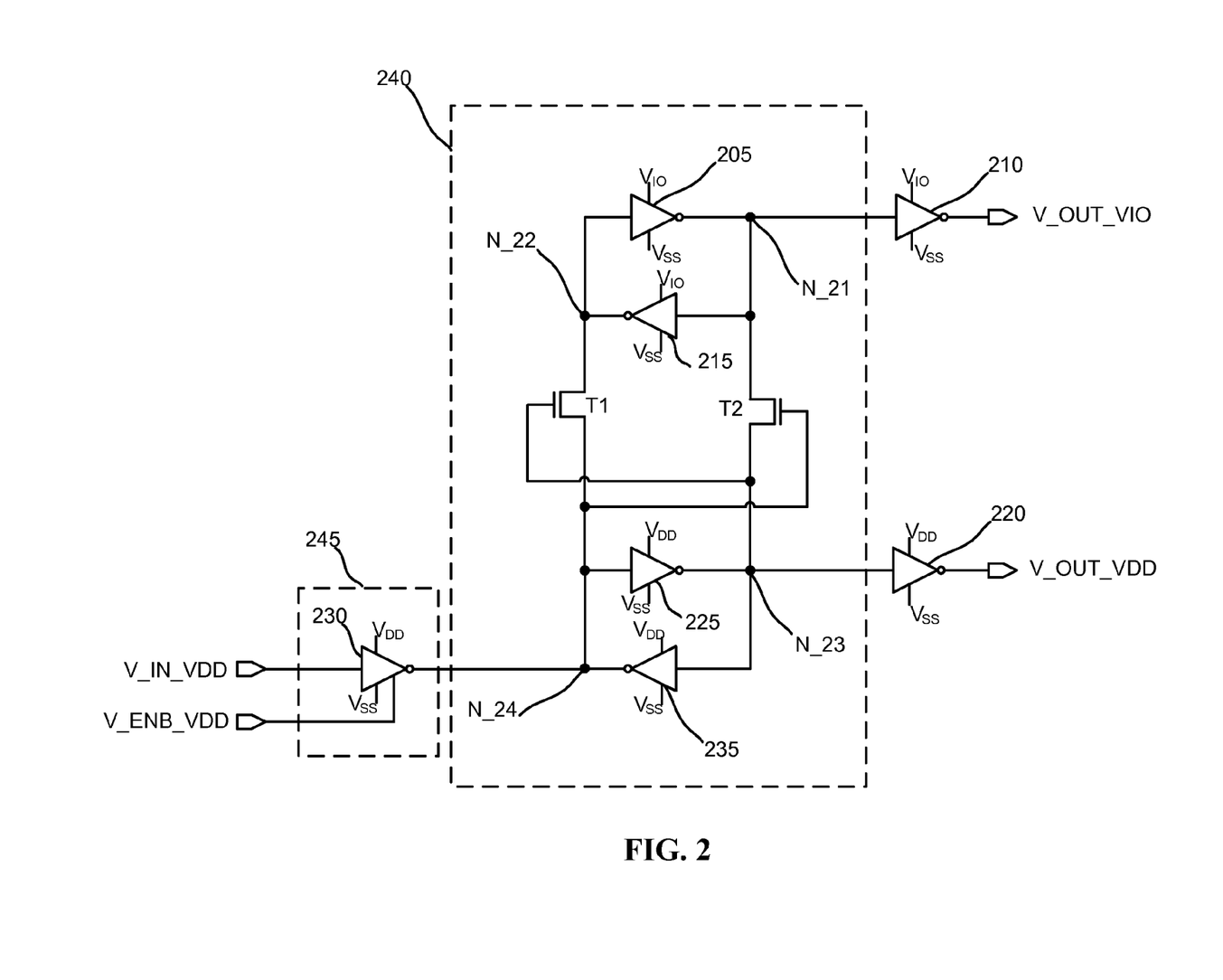
FIG. 2 depicts a voltage level-shifting latch having an input circuit, a level-shifting-latch circuit, and buffered outputs, according to various embodiments.

FIG. 2 depicts a voltage level-shifting latch having an input circuit 245, a level-shifting-latch circuit 240, and buffered outputs 210 and 220, according to various embodiments. The latch captures an output signal from logic circuits having a supply voltage of VDD (operating in the VDD domain) and can shift the signal to voltage levels within the logic thresholds of circuits having a supply voltage of VIO (operating in the VIO domain). More specifically, the circuit in FIG. 2 shifts the voltage level of an input signal V_IN_VDD generated by circuits from a first logic family whose supply voltage is VDD, to an output signal V_OUT_VIO that can be provided to (e.g., the output signal is within one of the defined logic threshold ranges for) circuits of a second logic family whose supply voltage is VIO. In some embodiments VSS (i.e., ground for some CMOS circuits) is common between the VDD domain and the VIO domain.

According to some embodiments, VDD may be less than VIO (e.g. VDD=1.2V, and VIO=3.3V). In those embodiments, the voltage level-shifting latch in FIG. 2 shifts input signal V_IN_VDD up from a lower voltage domain, VDD, to a higher voltage domain, VIO. An example embodiment fitting this scenario can include the logic circuits in a microprocessor providing control signals for driver circuits interfacing with off chip I/O. The controlling logic circuits may be powered by a low on-chip supply voltage (VDD) at 1.8V, while the I/O drivers may be powered by a higher off chip supply voltage (VIO) at 3.3V. The voltage level-shifting latch in FIG. 2 may enable control and data signals provided by the controlling logic control circuits operating in the VDD domain to be accessed by the I/O driver circuits operating in the VIO domain. In other embodiments, VDD may be greater than VIO, in which case the level-shifting latch in FIG. 2 would shift input signal V_IN_DD down from the higher VDD domain to the lower VIO domain.

Referring still to FIG. 2, some embodiments of the level-shifting latch may provide an un-shifted latched VDD domain output signal V_OUT_VDD. This output can mirror the input signal V_IN_VDD and can be used for on-chip functions such as calibration or testing.

FIG. 2 includes the level-shifting latch circuit 240, input circuit 245 having a gated buffer 230, a VIO domain output buffer 210, and a VDD domain output buffer 220. The level-shifting latch circuit includes two NFET pass transistors T1 and T2 and four inverters 205, 215, 225 and 235. In some embodiments, the gated input buffer 230 may be the same circuit as the gated inverter circuit 105 shown in FIG. 1. Similarly, the inverters 205, 215 and output buffer 210 can be the same circuit as the inverter circuit 100 in FIG. 1, but having supply voltage VIO. The remaining inverters 225 and 235, and output buffer 220 can be the same circuit as the inverter circuit 100 in FIG. 1, but having supply VDD.

Still referring to FIG. 2, the gated input buffer 230 has a first input terminal connected to the input signal V_IN_VDD, a second input terminal connected to the control signal ENB_VDD, and an output terminal connected to the node N_24. The input buffer is enabled when ENB_VDD is low. Both V_IN_VDD and ENB_VDD may be supplied by logic circuits (not shown) operating in the VDD domain.

The level-shifting latch circuit 240 has a first latch in the VDD domain formed with cross coupled inverters 225 and 235. The first latch has a first node connected to nodes N_24 and a second node connected to node N_23. The input terminal of inverter 225 and the output terminal of inverter 235 are connected to node N_24, while the output terminal of inverter 225 and the input terminal of inverter 235 are connected node N_23. In some embodiments, the orientation of the inverters 225 and 235 may be reversed.

The input terminal of inverter 220 is connected to the output of inverter 225 at node N_23, while the output terminal of inverter 220 is connected to the output signal V_OUT_VDD. The inverter 220 inverts the output of inverter 225 and produces the buffered output signal V_OUT_VDD which follows (has the same signal value as) the input signal V_IN_VDD. In some embodiments, the input terminal of inverter 220 may be connected to the output of inverter 235 at note N_24. In those embodiments the inverter 220 may be replaced by a non-inverting buffer (not shown) in order to produce an output signal V_OUT_VDD which follows the input signal V_IN_VDD.

The level-shifting latch circuit 240 has transistors T1 and T2 serially connected between the first latch, and a second latch formed by inverters 205 and 215. The first and second source/drain terminals of transistor T1 are connected to nodes N_22 and N_24, respectively, while the gate terminal is connected to node N_23. Similarly, the first and second source/drain terminals of transistor T2 are connected to nodes N_21 and N_23, respectively, while the gate terminal is connected to node N_24. Transistors T1 and T2 can pass a low voltage from the first latch to the second latch. High values from the first latch are not passed to the second latch. In the example of VDD=1.2V, VIO=3.3V, the first latch could not pass a high voltage to switch the second latch.

Cross coupled inverters 205 and 215 form the second latch in the VIO domain, similar to the first latch formed by inverters 225 and 235 in the VDD domain. The input terminal of inverter 205 and the output terminal of inverter 215 are connected to node N_22, while the output terminal of inverter 205 and the input terminal of inverter 215 are connected node N_21. In some embodiments, the orientation of the inverters 205 and 235 may be reversed.

The input terminal of inverter 210 is connected to the output terminal of inverter 205 at node N_21, while the output terminal of inverter 210 is connected to the output signal V_OUT_VIO. Inverter 210 inverts the output of inverter 205 and produces the buffered output signal V_OUT_VIO. The output V_OUT_VIO can have the same logic state as the input signal V_IN_VDD, but the signal voltage may be level-shifted into the VIO domain. In some embodiments, the input terminal of inverter 210 may be connected to the output of inverter 205 and note N_22. In those embodiments the inverter 210 may be replaced by a non-inverting buffer (not shown) in order to produce an output signal V_OUT_VIO having same logic state as V_IN_VDD, but level-shifted into the VIO domain.

The operation of the voltage level-shifting latch is now described in reference to FIG. 2. When the control signal ENB_VDD is low, the input signal V_IN_VDD can be inverted by gated inverter 230 and presented to the level-shifting latch circuit at node N_24. If the output of gated inverter 230 is the same logic level as the output of inverter 235, there may be no stable change in the first latch's state. When the output of inverter 230 is a different logic level from the output of inverter 235 (e.g., the output of inverter 230 is a logic 1 at a voltage level of 1.2V, and the output of inverter 235 is a logic 0 at a voltage level of 0V), there can be contention between the two signals. In this situation, the inverter having the stronger drive (able to source or sink the most current) may determine the stable state of the latch. Selecting inverter 230 to have a stronger drive (e.g. larger PFET and NFET transistors) than inverter 235 may cause the output of inverter 235 to be pulled to an intermediate voltage level (e.g., 1.1V). If the intermediate voltage level is within the logic threshold range for the logic level driven by inverter 230, the inverter 225 may change state to provide an out in the complementary logic threshold range. For example, given VDD=1.2V and a logic threshold range for a logic 1 of a voltage above 66% of VDD, the intermediate voltage of 1.1V given in the earlier example can cause inverter 225 to switch to a logic 0 output at node N_23. Inverter 225's logic 0 output at node N_23 can then cause inverter 235 to output a logic level 1 (e.g., 1.2V) at node N_24. The input signal V_IN_VDD can then be removed (i.e., by setting V_ENB_VDD=1), and the first latch will retain this new state.

The functionality of the rest of the level-shifting latch can be described by considering two scenarios. In the first scenario, the data stored in the first latch causes the voltage level at node N_23 to be high (inverter 225's output is a logic 1), and the voltage at node N_24 to be low (inverter 235's output is a logic 0). The NFET transistor T2 may be turned off because its gate, connected to node N_24, is at a lower voltage than its source/drain terminal connected to node N_23. Additionally, the NFET transistor T1 may be turned on because its gate, connected to node N_23, is at a higher voltage than its source/drain terminal at connected to node N_24. Since T2 is off, the high voltage a node N_23 may cutoff from node N_21. However, since transistor T1 is on, the low voltage at node N_24 can pulled down the voltage at node N_22. Pulling down the voltage at node N_22 can cause inverter 205 produce an output voltage corresponding to a logic 1, in the VIO domain. Thus, the logic state of inverter 205 can match the logic state of inverter 225. The output voltage level of inverter, however, 225 will be in the VDD domain, while the output voltage level of inverter 205 will be in the VIO domain. To complete the latching, the high output voltage at node N_21 can cause inverter 215 to drive a low, matching the logical level of inverter 235.

In an alternate scenario, data is captured in the first latch which causes the voltage at node N_23 to be low (inverter 225's output is a logic 0), and the voltage at node N_24 to be high (inverter 235's output is a logic 1). Under these conditions, transistor T2 may be turned on while transistor T1 can be turned off. Since T1 is off, the high voltage a node N_24 can be cutoff from node N_22. However, because T2 is on, the low voltage at node N_23 can pulled down the voltage at node N_21. Pulling down the voltage at node N_21 can cause inverter 215 to produce an output voltage corresponding to a logic 1 in the VIO domain. The logic 1 output from inverter 215 at node N_22 can cause inverter 205 to drive low, thus completing the latching. As in the previous scenario, the logic states of inverters 205 and 215 will match the logic states of inverters 225 and 235 respectively; the output voltage levels of each inverter, however, will be in the voltage range dictated by their respective voltage domains.

The contention caused when switching states in the first latch may be resolved in the second latch without the need for larger driving transistors. This is because the state of the second latch is only changed by passing a logic 0 from the first latch to the second latch (e.g., pulling down the output of one of the inverters 205 and 215). This creates a situation where the PFET transistors in second latch are pulling up against the NFET transistors pulling down in the first latch. If the transistors in each latch are equivalently sized, the drive of the NFET transistors will overpower the PFET due to, inter alia, the higher electron mobility of NFET transistors. The connection of the gates of NFET transistors T1 and T2 to node N_23 and N_22 respectively, ensures that T1 and T2 only pass low voltages from the first latch to the second latch; high voltages a blocked by the transistors. This may prevent a situation where a high output from an inverter in the first latch from trying to pull up a low output from an inverter in the second latch (for the inverters in the first latch to succeed, the PFETs in the first latch would have to be sized larger than the NFETs in the second latch).

Inverters 220 and 210 couple the data stored in the first and second latch to the output signals V_OUT_VDD and V_OUT_IO, respectively. The output signal V_OUT_VDD may have both the same logic and voltage level as the input signal V_IN_VDD, and may provide an input to logic circuits (not shown) in the VDD domain. The output signal V_OUT_IO may have the same logic level as V_IN_VDD, but the voltage level will be shifted to the VIO domain, and may provide an input to logic circuits (not shown) in the VIO domain.

Figure 3:
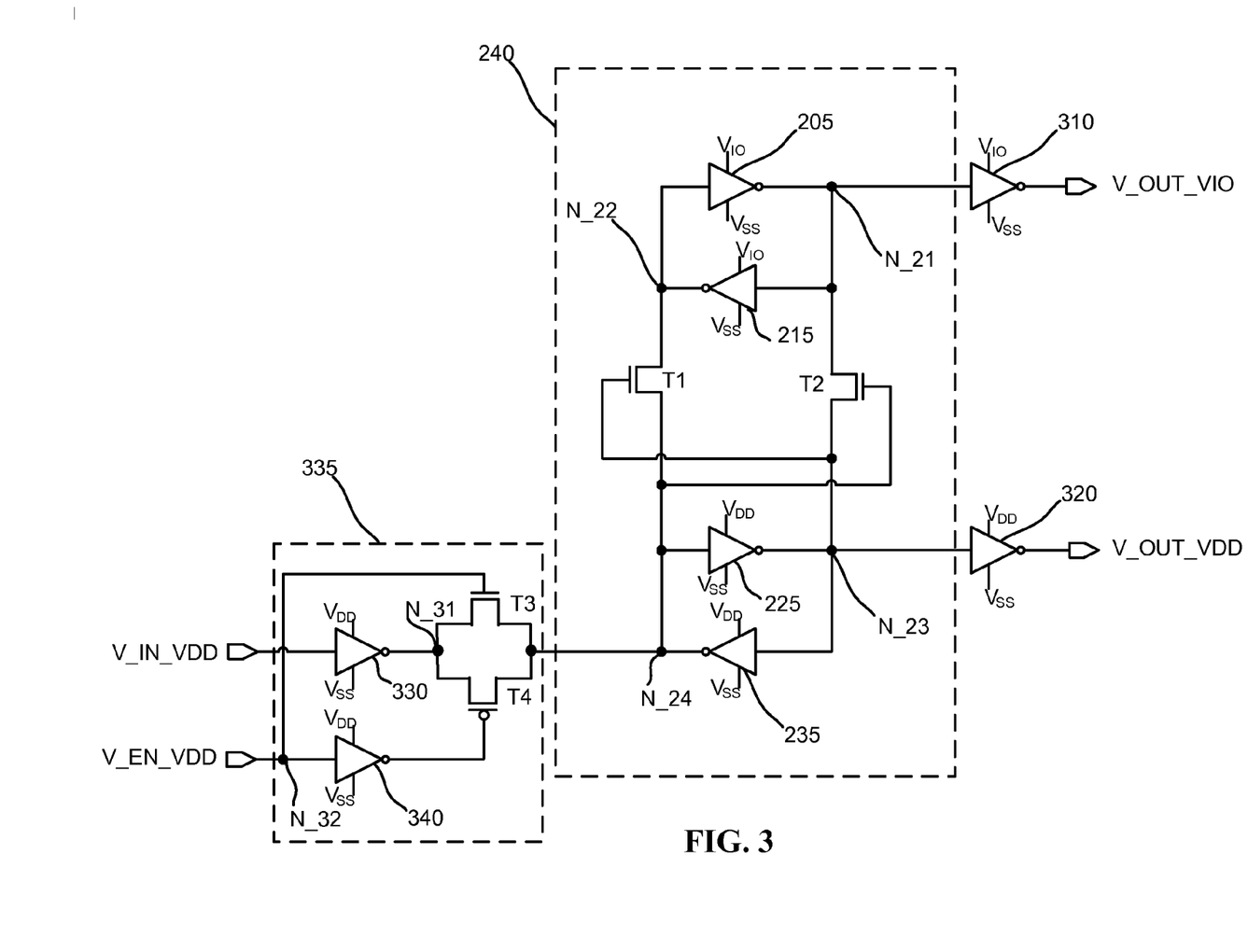
FIG. 3 depicts a voltage level-shifting latch driven by an inverting buffer through a transmission gate, according to various embodiments.

FIG. 3 depicts a voltage level-shifting latch driven by an inverting buffer through a transmission gate, according to various embodiments. The device shown in FIG. 3 includes an input circuit 335, the level-shifting latch circuit 240 described previously in association with FIG. 2, and two inverters 310 and 320. The inverters 310 and 320 can be the same circuit inverters 210 and 220, respectively, described in association with FIG. 2. The input terminals of inverters 310 and 320 are coupled to the nodes N_21 and N_23, respectively, of the level-shifting latch circuit 240, while their outputs are respectively coupled to the signals V_OUT_VIO and V_OUT_VDD respectively.

The input circuit 335 is constructed with inverters 330 and 340, and a transmission gate formed with NFET transistor T3 and PFET transistor T4. Inverters 330 and 340 can be the same circuits as the inverters shown in circuit 100 of FIG. 1. The input of inverter 330 is connected to the input signal V_IN_VDD, while the output of inverter 330 is connected, at node N_31, to a first terminal of the transmission gate formed with transistors T3 and T4. A second terminal of the transmission gate is connected to the level-shifting latch circuit 240 at node N_24. A second input signal V_EN_VDD is connected to the gate of NFET transistor T3 and the input of inverter 340 at node N_32. The output of inverter 340 is connected to the gate of PFET transistor T4. The transmission gate is enabled when V_EN_VDD is high, and disabled when V_EN_VDD is low.

When V_EN_VDD is high, the input circuit 335 can pass V_IN_VDD through the transmission gate to node N_24. Under this condition the level-shifting latch circuit 240 will operate as described during the discussion of FIG. 2. However, when V_EN_VDD is low, the transmission gate will be disabled, preventing V_IN_VDD (via the output of inverter 330) from driving or influencing the state of the level-shifting latch circuit 240. For the reasons disclosed in the discussion of FIG. 2, transistors T3 and T4, along with the transistors forming inverter 330 can be selected so that the drive of the input circuit 335 can force the first latch to a stable state dictated by V_IN_VDD.

Figure 4:
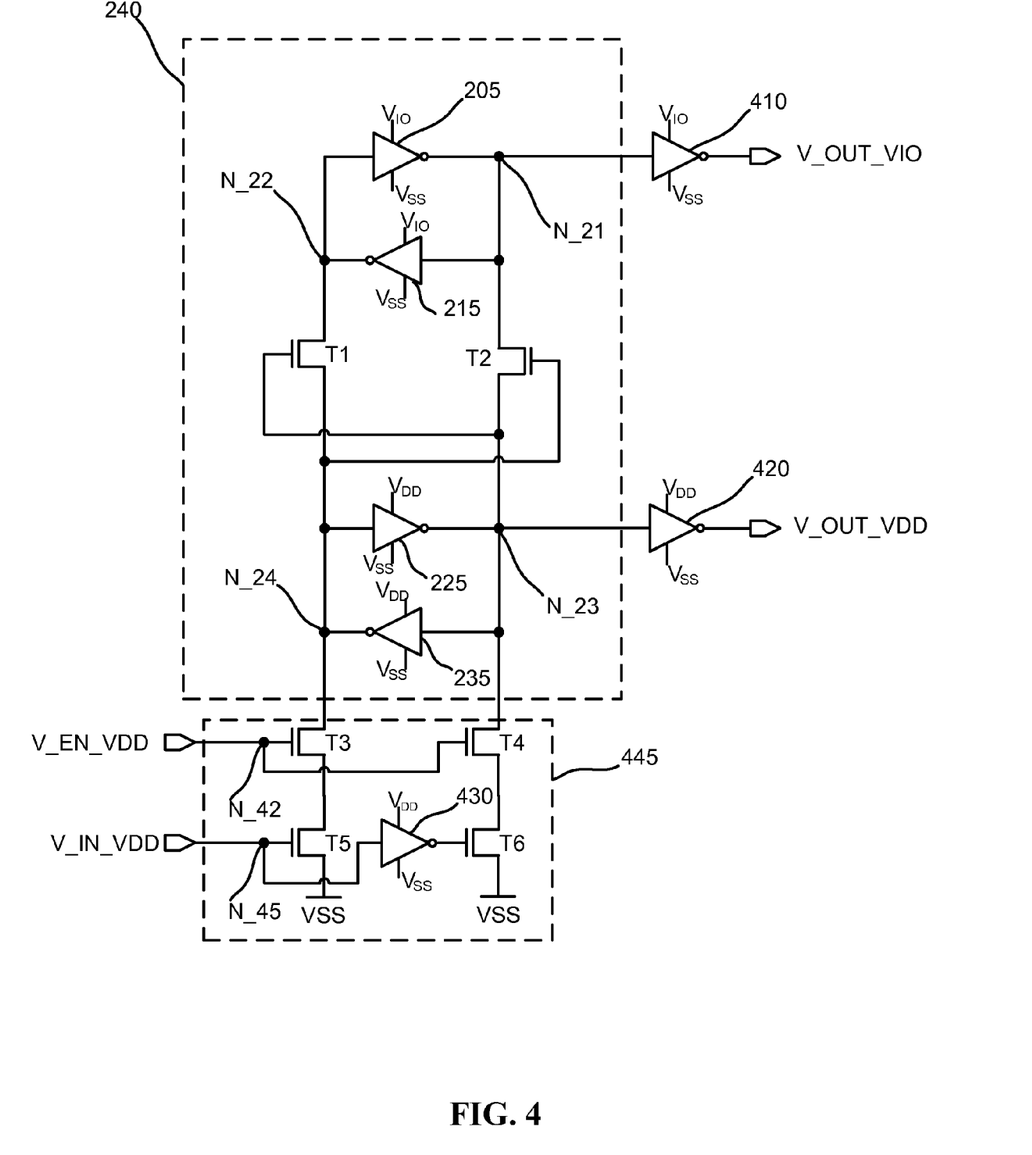
FIG. 4 depicts a voltage level-shifting latch having an input circuit, a level-shifting-latch circuit, and buffered outputs, according to various embodiments.

FIG. 4 depicts a voltage level-shifting latch having an input circuit, a level-shifting-latch circuit, and buffered outputs, according to various embodiments. FIG. 4 includes an input circuit 445, the level-shifting latch circuit 240 described previously in association with FIG. 2, and two inverters 410 and 420. The inverters 410 and 420 can be the same circuit as the inverters 210 and 220, respectively, described in association with FIG. 2. The inputs of inverters 410 and 420 are coupled to the nodes N_21 and N_23, respectively, of the level-shifting latch circuit 240, while their outputs are respectively coupled to the signals V_OUT_VIO and V_OUT_VDD. In some embodiments V_OUT_VIO and V_OUT_VDD may be inverting (e.g., they may have the complementary logic state of V_IN_VDD). In particular embodiments, the output inverters 410 and 420 may be replaced by non-inverting buffers.

The input circuit 445 includes NFET transistors T3 and T5 serially connected between node N_24 and VSS, and NFET transistors T4 and T6 serially connected between node N_23 (e.g., a second input node) and VSS. The gates of transistors T3 and T4 are both connected to the control signal V_EN_VDD at node N_42 (e.g., a second input). Input circuit 445 also includes inverter 430 having an output terminal connected to the base of transistor T6, and an input terminal connected to both the base of transistor T5 and the input signal V_IN_VDD at node N_45 (e.g., a first input). The inverter 430 can be the circuit as the inverter 210 discussed in association with FIG. 2.

A low signal at V_EN_VDD can cause both transistor T3 and T4 to be turned off, isolating transistors T5 and T6 from nodes N_24 and N_23 respectively. A high signal at both V_EN_VDD and V_IN_VDD can turn on both transistor T3 and T5, creating an electrical path between node N_24 and VSS. If the output of inverter 235 is high (e.g., the input to inverter 235 is low), the voltage at node N_24 will be pulled down to VSS through transistors T3 and T5, causing the output of inverter 225 to switch to high. For reasons disclosed in the discussion of FIG. 2, this may then cause the output of inverter 235 to go low, establishing a stable state in the first latch. The state of the second latch can be determined as disclosed in the discussion of FIG. 2.

When V_EN_VDD is high, and V_IN_VDD is low, transistor T4 will be turned on while transistor T3 is turned off. Additionally, the input of inverter 430 will be low, causing the output of inverter 430 to be high. The high output of inverter 430 will turn on transistor T6, creating an electrically path between node N_23 and VSS. If the output of inverter 225 is high (e.g., the input to inverter 225 is low), the voltage at node N_23 will be pulled down to VSS through transistors T4 and T6, causing the output of inverter 235 to switch to high. For reasons disclosed in the discussion of FIG. 2, this may then cause the output of inverter 225 to go low, establishing a stable state (complementary to the state established in the previous paragraph) in the first latch. The state of the second latch can be determined as disclosed in the discussion of FIG. 2.

The input circuit in FIG. 4 allows the first latch to be switched between stable states by selectively pulling the high outputs of each cross-coupled inverter down to VSS. Thus, the state of the first latch is switched by having the drive of an NFET overpower the drive of a PFET. As discussed earlier, for a given process and a geometry, NFETs may have stronger drive than PFETs. Thus, the transistors in input circuit 445 may be the same size as the transistors in circuit 240 (notably, the transistors in inverter 235 do not have to be smaller/weaker than the transistors in circuit 445). This enables the voltage level-shifting latch in FIG. 4 to be designed to be more symmetric than the voltage level-shifting latches in FIG. 2 and FIG. 3.

Figure 5:
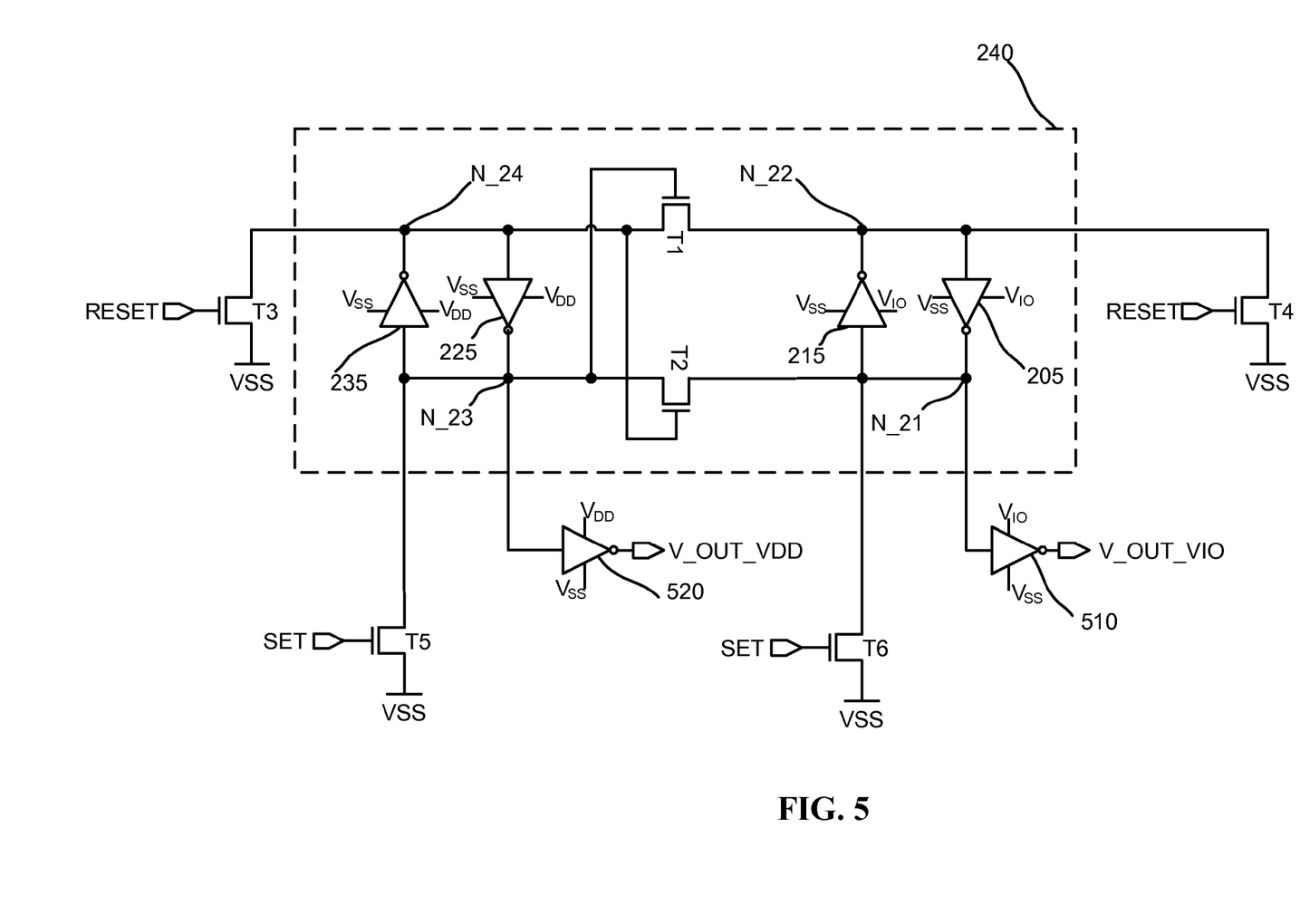
FIG. 5 depicts a voltage level-shifting set-reset latch, according to various embodiments.

FIG. 5 depicts a level-shifting set-reset latch, according to various embodiments. The circuit in FIG. 5 is the same as the circuit in in FIG. 3, with the exception that the input circuit 335 from FIG. 3 was removed, and NFET transistors T3, T4, T5 and T6 have been added. FIG. 5 includes the level-shifting latch circuit 240 described previously in association with FIG. 2, and two inverters 410 and 420. The inverters 410 and 420 can be the same circuit as the inverters 210 and 220, respectively, described in association with FIG. 2. The inputs of inverters 310 and 320 are coupled to the nodes N_21 and N_23, respectively, of the level-shifting latch circuit 240, while their outputs are respectively coupled to the signals V_OUT_VIO and V_OUT_VDD.

As shown in FIG. 5, the gate of transistors T3 and T4 are connected to the input signal RESET. The first and second source/drain terminals of transistor T3 are serially connected between node N_24 and VSS, while the first and second source/drain terminals of transistor T4 are serially connected between node N_22 and VSS. When RESET is high, transistors T3 and T4 will pull down the voltages at nodes N_24 and N_22, respectively. This will force the first and second latches in level-shifting latch circuit 240 high at nodes N_23 and N_21 respectively. The high voltage at nodes N_23 and N_21 will cause inverters 420 and 410 to provide a low output to signals V_OUT_VDD and V_OUT_VIO, respectively. The level-shifting latch circuit 240 to latch can retain this state after RESET is removed.

Also shown in FIG. 5, the gate of transistors T5 and T6 are connected to the input signal SET. The source/drain terminals of transistor T5 are serially connected between node N_23 and VSS, while the source/drain terminals of transistor T6 are serially connected between node N_21 and VSS. When SET is high, transistors T5 and T6 will pull the voltages at nodes N_23 and N_21 low, respectively. The low voltage at nodes N_23 and N_21 will force the first and second latches in level-shifting latch circuit 240 to latch the voltage low at nodes N_23 and N_21, respectively. The low voltages at nodes N_23 and N_21 will cause inverters 420 and 410 to provide a high output to signals V_OUT_VDD and V_OUT_VIO, respectively. The level-shifting latch circuit 240 to latch can retain this state after SET is removed.

Figure 6:
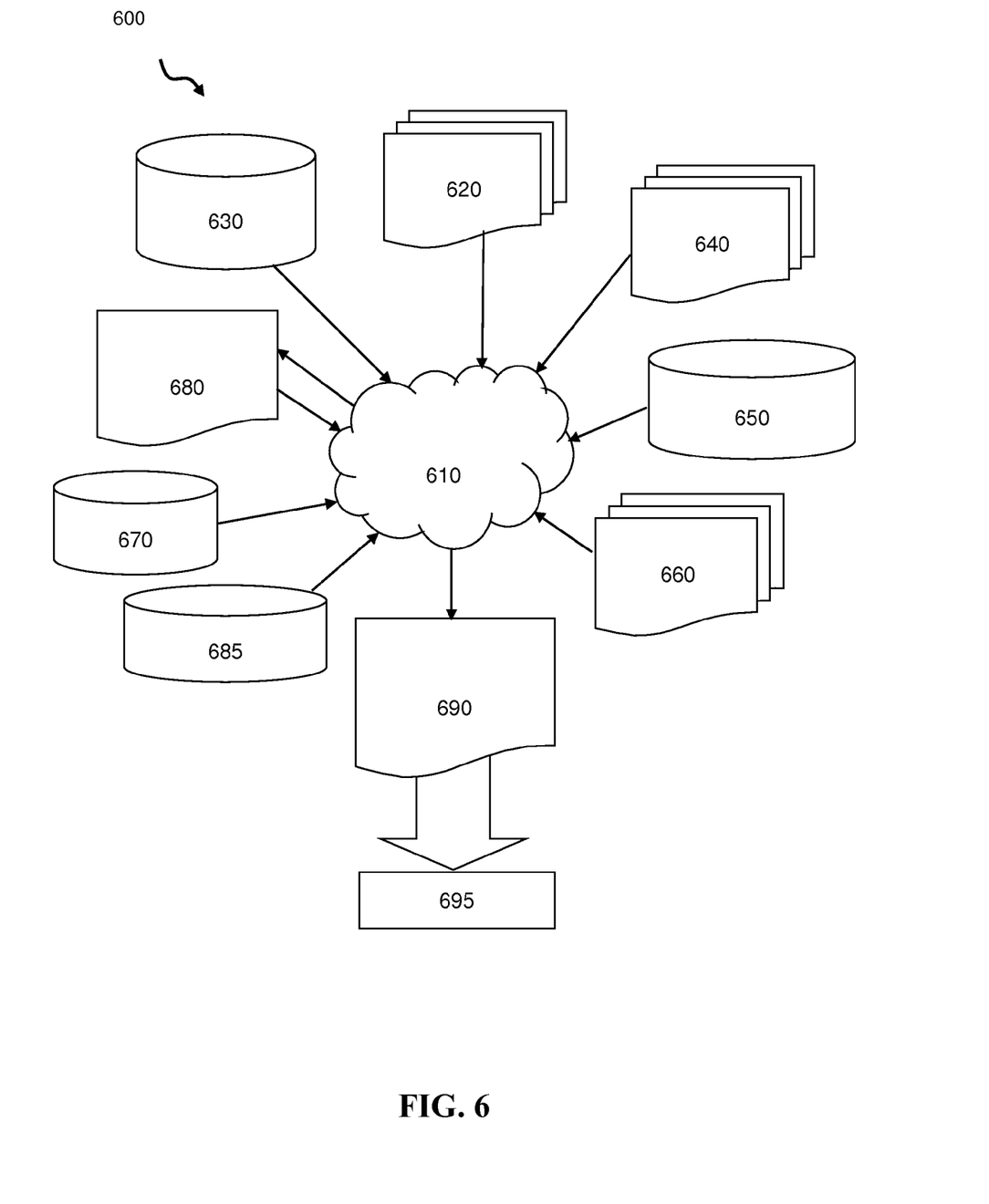
FIG. 6 is a flow diagram of a design process used in semiconductor design, manufacture, and/or test.

FIG. 6 shows a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above and shown in FIGS. 1-5. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those shown in FIGS. 1-5. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1-5 to generate a Netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which Netlist 680 is resynthesized one or more times depending on design specifications and parameters for the device. As with other design structure types described herein, Netlist 680 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including Netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-5. In one embodiment, design structure 690 may comprise a compiled, executable HDL simulation model that functionally simulates the devices shown in FIGS. 1-5.

Design structure 690 may also employ a data format used for the exchange of layout data of integrated circuits and/or symbolic data format (e.g. information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-5. Design structure 690 may then proceed to a stage 695 where, for example, design structure 690: proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for coupling a first circuit in a first voltage domain with a second circuit in a second voltage domain, the first voltage domain having a first supply voltage and the second voltage domain having a second supply voltage, comprising:
    receiving an input signal from the first circuit;
    storing the input signal in a first latch, the first latch having a first node and a second node, and powered by the first voltage;
    transferring a logic state of a stored input signal in the first latch to a second latch, having a third node and a fourth node, through one of a first switching element and a second switching element, wherein the first switching element is configured to pass a low voltage from the first node to the third node when a voltage at the second node is high, and wherein the second switching element is configured to pass a low voltage from the second node to the fourth node when a voltage at the first node is high, and wherein the second latch is powered by the second voltage;
    providing a level-shifted output signal, corresponding with the input signal, from the second latch to the second circuit; and
    enabling the storage of signal values in the first and second by closing a switching element coupled between both the first and second latch and ground.

2. The method of claim 1, wherein the first latch includes a set of cross coupled inverters, each inverter powered by the first supply voltage.

3. The method of claim 1, wherein the second latch includes a set of cross coupled inverters, each inverter powered by the second supply voltage.

4. The method of claim 1, further comprising:
    providing a second output signal, corresponding with the input signal, from the first latch to a third circuit powered by the first voltage.

5. The method of claim 1, further comprising:
    selectively passing the input signal from the first circuit to the first latch via an input circuit serially coupled between the input signal and the first latch.

6. The method of claim 1, wherein the method further comprises:
    storing a signal value in the first latch by closing a switching element coupled between a node on the first latch and ground; and
    storing a signal value in the second latch by closing a switching element coupled between a node on the second latch and ground.

7. The method of claim 1, wherein the first and second switching elements each comprise an N-channel metal oxide semiconductor transistor.

* * * * *